US010144042B2

(12) United States Patent
Hashimoto

(10) Patent No.: US 10,144,042 B2
(45) Date of Patent: Dec. 4, 2018

(54) HELICALLY TRAVELING CARRIAGE AND HELICALLY TRAVELING CLEANING MACHINE

(71) Applicant: TRINITY INDUSTRIAL CORPORATION, Toyota-shi, Aichi (JP)

(72) Inventor: Takashi Hashimoto, Nagoya (JP)

(73) Assignee: TRINITY INDUSTRIAL CORPORATION, Toyota (JP)

( * ) Notice: Subject to any disclaimer, the term of this patent is extended or adjusted under 35 U.S.C. 154(b) by 0 days.

(21) Appl. No.: 15/327,259

(22) PCT Filed: Jul. 10, 2015

(86) PCT No.: PCT/JP2015/069874
§ 371 (c)(1),
(2) Date: Jan. 18, 2017

(87) PCT Pub. No.: WO2016/047244
PCT Pub. Date: Mar. 31, 2016

(65) Prior Publication Data
US 2017/0173645 A1   Jun. 22, 2017

(30) Foreign Application Priority Data

Sep. 25, 2014   (JP) .................................. 2014-194642

(51) Int. Cl.
*B08B 9/032*   (2006.01)
*B08B 3/02*   (2006.01)
(Continued)

(52) U.S. Cl.
CPC ............ *B08B 9/0321* (2013.01); *B08B 3/024* (2013.01); *B08B 9/00* (2013.01);
(Continued)

(58) Field of Classification Search
CPC .......... B08B 9/04; B08B 9/043; B08B 9/0433; B08B 9/0436; B08B 9/045; B08B 9/047;
(Continued)

(56) References Cited

U.S. PATENT DOCUMENTS 1,132,691 A * 3/1915 Sieben .................... B08B 9/051
15/104.12
2,579,813 A * 12/1951 Frank .................... B08B 9/0436
15/104.05
(Continued)

FOREIGN PATENT DOCUMENTS

JP   S55-74723 U    5/1980
JP   S62-247878 A   10/1987
(Continued)

OTHER PUBLICATIONS

Apr. 1, 2015 Decision to Grant a Patent issued in Japanese Patent Application No. 2014-194642.
(Continued)

*Primary Examiner* — David G Cormier
(74) *Attorney, Agent, or Firm* — Oliff PLC

(57) ABSTRACT

Provided are a helically traveling carriage and a helically traveling cleaning machine capable of efficiently performing a maintenance process, such as cleaning, with respect to a helical structure formed by winding a helical wall around a column at a central section of a vertically extending cylindrical wall. This helically traveling carriage includes a lower moving-and-contacting part that rolls or slides on a helical wall's upper surface, a lateral bridge mechanism that bridges a column's outer circumferential surface and a cylindrical wall's inner circumferential surface, the lateral bridge mechanism having, on one end thereof, a first moving-and-contacting part that rolls or slides on the cylindrical wall's inner circumferential surface, and having, on the other end, a second moving-and-contacting part that rolls or slides on
(Continued)

the column's outer circumferential surface, and a rotary engagement part that rotatably engages with the column by laterally receiving a portion of the column.

13 Claims, 7 Drawing Sheets

(51) Int. Cl.
*B08B 9/00* (2006.01)
*B65G 45/22* (2006.01)
*B65G 11/06* (2006.01)

(52) U.S. Cl.
CPC . *B08B 2203/0247* (2013.01); *B08B 2209/032* (2013.01); *B08B 2209/055* (2013.01); *B65G 11/063* (2013.01); *B65G 45/22* (2013.01)

(58) Field of Classification Search
CPC ..... B08B 9/049; B08B 9/0492; B08B 9/0495; B08B 9/0497; B08B 9/051; B08B 2209/04; B08B 9/09; B08B 9/0936; B07B 13/11; B03B 5/626
See application file for complete search history.

(56) References Cited

U.S. PATENT DOCUMENTS

| | | | |
|---|---|---|---|
| 2,641,010 A * | 6/1953 | Lang | B08B 9/0436 15/104.15 |
| 5,038,810 A * | 8/1991 | Pacheco | B05B 3/06 134/167 R |
| 5,551,458 A | 9/1996 | Faxon | |
| 6,279,589 B1 * | 8/2001 | Goodley | B08B 9/0936 134/102.1 |
| 2010/0314863 A1 * | 12/2010 | Ohara | F16L 37/091 285/31 |

FOREIGN PATENT DOCUMENTS

| | | |
|---|---|---|
| JP | H07-000933 A | 1/1995 |
| JP | 2002-144375 A | 5/2002 |
| JP | 2003-236482 A | 8/2003 |
| JP | 2003-251234 A | 9/2003 |
| WO | 2009/069955 A2 | 6/2009 |

OTHER PUBLICATIONS

Feb. 10, 2015 Office Action issued in Japanese Patent Application No. 2014-194642.

Oct. 6, 2015 International Search Report issued in International Patent Application No. PCT/JP2015/069874.

Oct. 6, 2015 Written Opinion issued in International Application No. PCT/JP2015/069874.

* cited by examiner

HELICALLY TRAVELING CARRIAGE AND HELICALLY TRAVELING CLEANING MACHINE

TECHNICAL FIELD

The present invention relates to a helically traveling carriage that travels inside a helical structure formed by winding a helical wall around a column at a central section of a vertically extending cylindrical wall, and a helically traveling cleaning machine including a cleaning device equipped on the helically traveling carriage.

BACKGROUND ART

As a traveling carriage of a cleaning machine that cleans the inside of a vertically extending cylindrical wall, there is known one that moves vertically by extending leg parts in four directions inside the cylindrical wall and rolling wheels provided at tip ends of the leg parts in a state where the wheels are pressed against an inner circumferential surface of the cylindrical wall (for example, refer to Patent Literature 1).

RELATED ART DOCUMENTS

Patent Documents

Patent document 1: Japanese Unexamined Patent Application Publication No. 2003-236482 (FIGS. 2 to 4)

DISCLOSURE OF THE INVENTION

Problems to be Solved by the Invention

However, there was a conventional problem in which, in a case where a helical wall was provided inside a cylindrical wall like a luggage descending chute on which luggage was helically slid down, a carrier machine that carried powder and granular materials by rotating a helical wall inside a cylindrical wall or the like, a traveling carriage could not be moved inside the cylindrical wall.

The present invention has been made in view of the above-described circumstances, and an object thereof is to provide a helically traveling carriage and a helically traveling cleaning machine capable of efficiently performing a maintenance process such as cleaning inside a helical structure with a helical wall inside a vertically extending cylindrical wall.

Means of Solving the Problems

A helically traveling carriage of the present invention made to attain the above-described object, is a helically traveling carriage that travels inside a helical structure formed by winding a helical wall around a column at a central section of a vertically extending cylindrical wall, and carries a maintenance device to maintain the inside of the helical structure, and includes a lower moving-and-contacting part that rolls or slides on an upper surface of the helical wall, a lateral bridge mechanism that bridges an outer circumferential surface of the column and an inner circumferential surface of the cylindrical wall, the lateral bridge mechanism having, on one end portion thereof, a first moving-and-contacting part that rolls or slides on the inner circumferential surface of the cylindrical wall, and having, on the other end portion, a second moving-and-contacting part that rolls or slides on the outer circumferential surface of the column, and a rotary engagement part that rotatably engages with the column by laterally receiving a portion of the column.

BEST MODE FOR CARRYING OUT THE INVENTION

Figure 1:
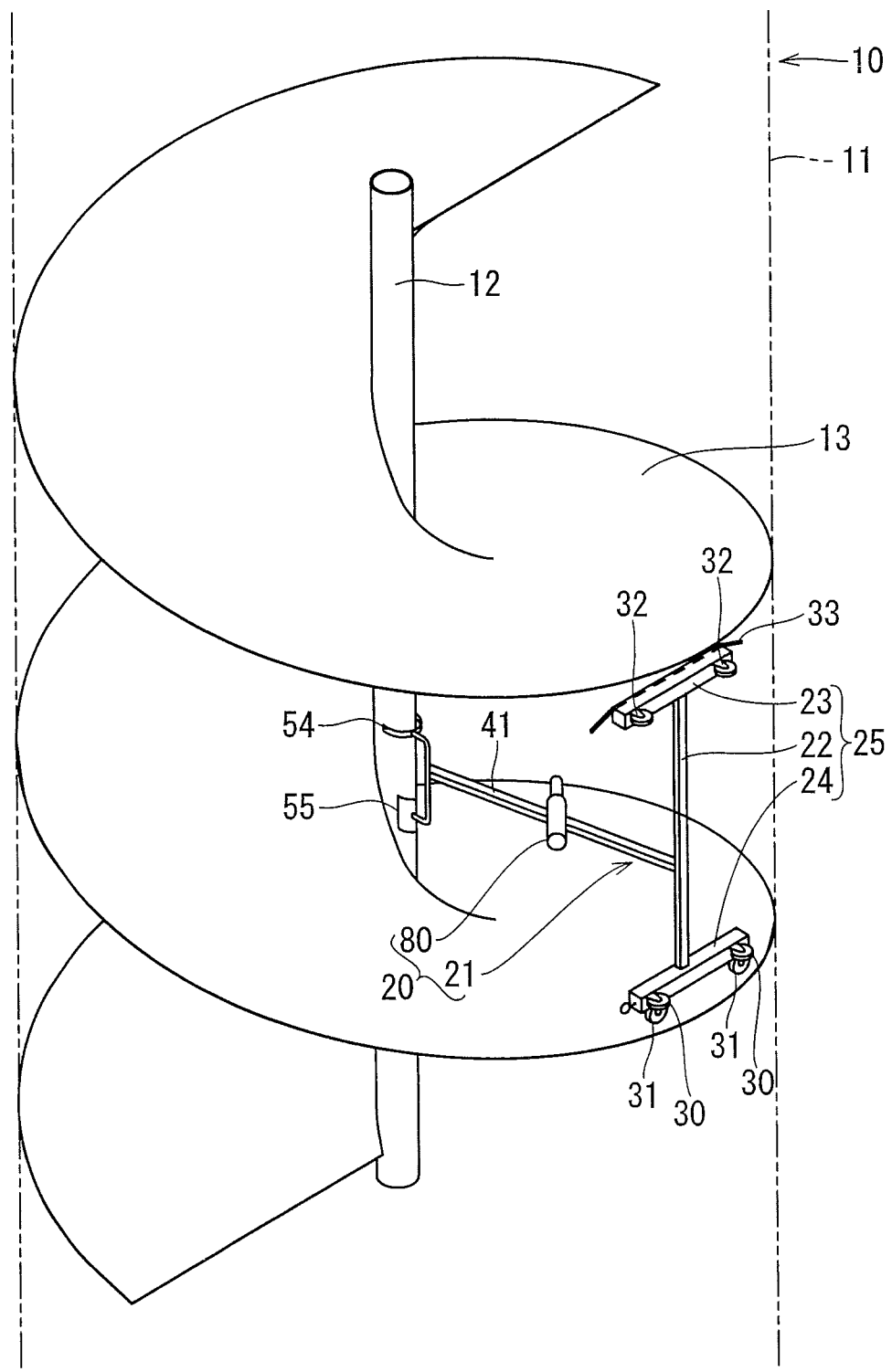
FIG. 1 is a perspective view of a helical structure and a helically traveling cleaning machine according to an embodiment of the present invention.

Hereinafter, an embodiment of the present invention is described based on FIG. 1 to FIG. 4. A helical structure 10 shown in FIG. 1 is, for example, a luggage descending chute on which luggage is helically slid down, and has a structure in which a column 12 is provided at a central section of a vertically extending cylindrical wall 11, and a helical wall 13 is helically wound around the column 12. At an upper end portion of the cylindrical wall 11, a luggage carry-in port not shown is provided, and at a lower end portion of the cylindrical wall 11, a luggage carry-out port not shown is provided. To clean the inside of this helical structure 10, a helically traveling cleaning machine 20 according to the present invention is used.

The helically traveling cleaning machine 20 is structured in such a manner that a cleaning device 80 is equipped on a helically traveling carriage 21 that travels on the helical wall 13 of the helical structure 10. This helically traveling carriage 21 includes a carriage main body 25 including an upper base 23 and a lower base 24 respectively provided on an upper end portion and a lower end portion of a vertically extensible bar 22 extending vertically.

Figure 2:
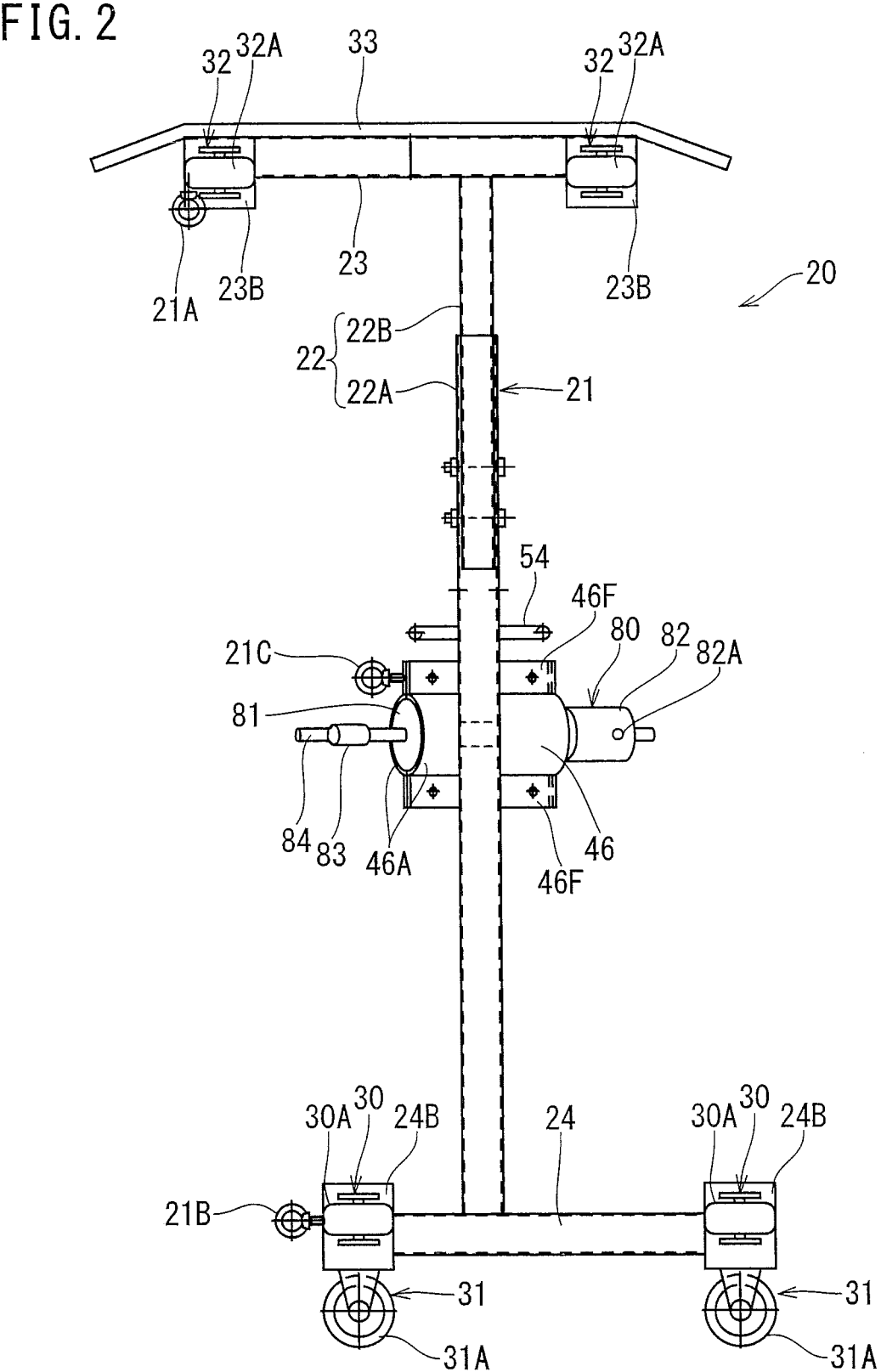
FIG. 2 is a side view of the helically traveling cleaning machine.
Figure 3:
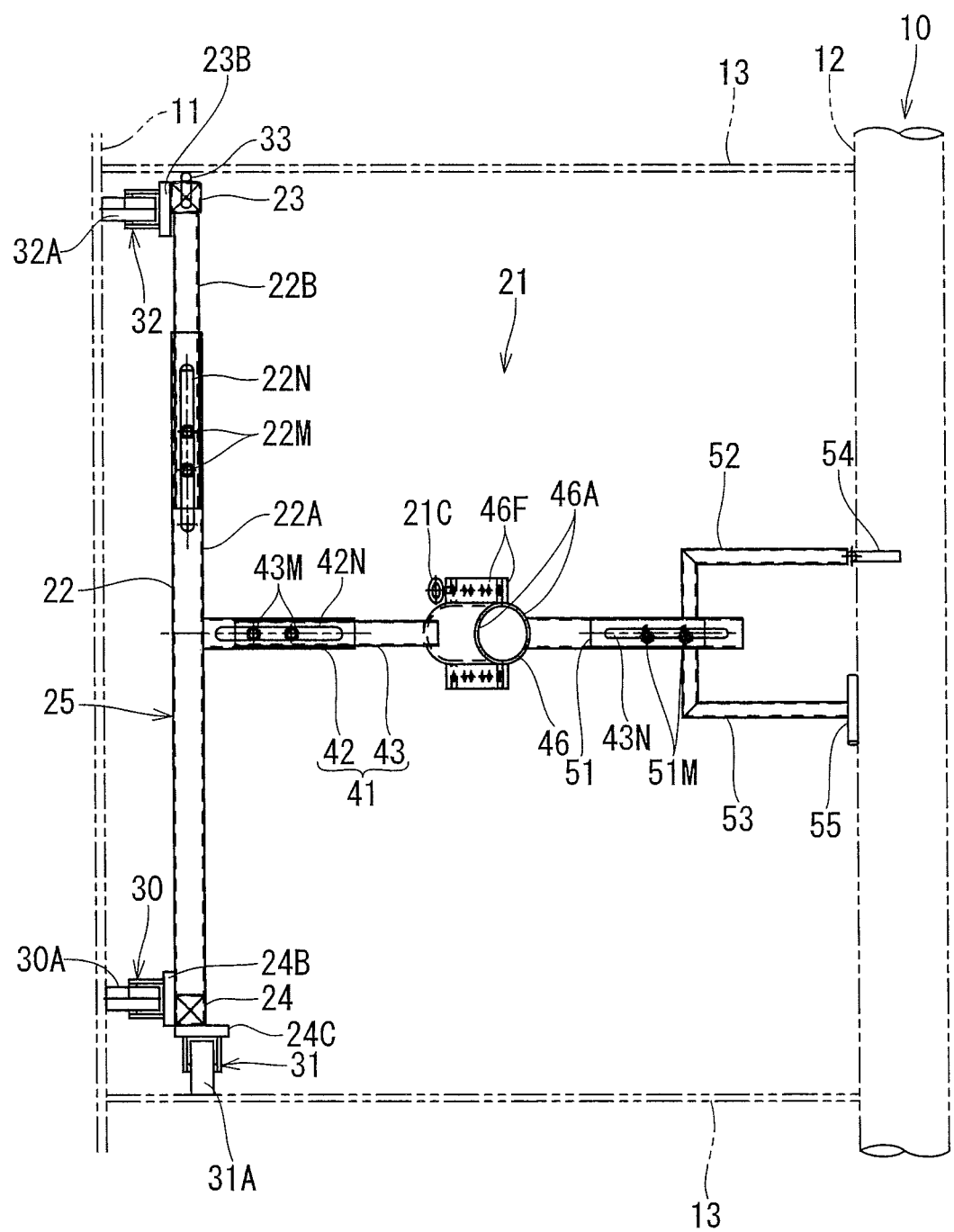
FIG. 3 is a front view of the helically traveling cleaning machine.

The lower base 24 of the carriage main body 25 has an angular cylindrical shape extending in a traveling direction of the helically traveling carriage 21 as shown in FIG. 2, and side plates 24B and bottom plates 24C shown in FIG. 3 are fixed in a superimposed manner to a front end portion and a rear end portion of one side surface and a lower surface of the lower base 24. To both front and rear side plates 24B and 24B, lower side casters 30 and 30 are attached, and wheels 30A and 30A of the lower side casters 30 and 30 rotate around rotation axes oriented vertically. To both front and rear bottom plates 24C and 24C, lower casters 31 and 31 (equivalent to the "lower moving-and-contacting part" of the present invention) are attached, and wheels 31A and 31A of the lower casters 31 and 31 rotate around rotation axes oriented laterally.

The upper base 23 of the carriage main body 25 has an angular cylindrical shape extending in parallel to the lower base 24 as shown in FIG. 2, and side plates 23B and 23B shown in FIG. 3 are fixed in a superimposed manner to a front end portion and a rear end portion of one side surface of the upper base 23. Upper side casters 32 and 32 are attached to the side plates 23B and 23B, and wheels 32A and 32A of the upper side casters 32 and 32 rotate around rotation axes oriented vertically. To an upper surface of the upper base 23, a sliding contact sled 33 formed of a wire rod having a circular section is attached. The sliding contact sled 33 has both end portions in a front-rear direction that are bent downward as shown in FIG. 2, and an intermediate portion in the front-rear direction that is fixed to the upper base 23 by, for example, welding in a state where the intermediate portion is superimposed on the upper surface of the upper base 23.

As shown in FIG. 3, the vertically extensible bar 22 of the carriage main body 25 includes an angular cylindrical lower bar 22A extending upward from the upper surface of the lower base 24, and an angular cylindrical upper bar 22B which extends downward from the lower surface of the upper base 23 and a portion of which is fitted to the inside of the lower bar 22A linearly movably. The fitting portion between the lower bar 22A and the upper bar 22B is disposed at a position closer to an upper end of the entire length of the vertically extensible bar 22, and in both side surfaces of the lower bar 22A at the fitting portion, slots 22N extending vertically are formed, and in the upper bar 22B, a pair of through holes 22M are formed side by side in the vertical direction at positions corresponding to the slots 22N. Nuts are tightened onto bolts inserted through the slots 22N and the through holes 22M, and a pair of washers inserted onto the bolts are pressed against opening edges of the respective slots 22N. Accordingly, the vertically extensible bar 22 can be adjusted to an arbitrary length.

In the present embodiment, the above-described vertically extensible bar 22, upper base 23, lower base 24, lower casters 31, and sliding contact sled 33 constitute the "vertical bridge mechanism" according to the present invention, and the sliding contact sled 33 is equivalent to the "third moving-and-contacting part" according to the present invention.

The above is a description of the structure of the carriage main body 25. As shown in FIG. 3, this carriage main body 25 is disposed adjacent to the inner circumferential surface of the cylindrical wall 11 inside the helical structure 10, and the upper and lower side casters 30 and 32 are placed on the inner circumferential surface of the cylindrical wall 11. The length of the vertically extensible bar 22 is adjusted in such a manner that while the lower casters 31 come into contact with the upper surface of the helical wall 13, the sliding contact sled 33 comes into contact with or become proximal to the lower surface of the helical wall 13.

To maintain the state where the carriage main body 25 is adjacent to the inner circumferential surface of the cylindrical wall 11, a swivel arm 41 extends to the column 12 side from a substantially central position in the vertical direction of the vertically extensible bar 22.

The swivel arm 41 includes an angular cylindrical first lateral bar 42 fixed orthogonally to the lower bar 22A, and an angular cylindrical second lateral bar 43 having one end portion fitted to the inside of the first lateral bar 42 and extending to a position close to the column 12, and at a halfway portion in the longitudinal direction of the second lateral bar 43, a device fixing part 46 is provided. At a fitting portion between the first and second lateral bars 42 and 43, in the same manner as the vertically extensible bar 22 described above, slots 42N are formed in the first lateral bar 42, and on the other hand, through holes 43M are formed in the second lateral bar 43, and nuts are screwed and fitted onto bolts inserted in these slots 42N and through holes 43M, and accordingly, the swivel arm 41 can be fixed at an arbitrary length.

The device fixing part 46 assumes a cylindrical shape, and has a central axis extending horizontally and obliquely crossing a central axis of the second lateral bar 43. The second lateral bar 43 is divided by the device fixing part 46. In detail, the second lateral bar 43 is divided into two, and the divided surfaces are respectively welded to the outer surface of the device fixing part 46. The device fixing part 46 is divided into a pair of half pipes 46A and 46A by a vertical plane including the central axis, and by fixing flanges 46F laterally projecting from both side edge portions of both half pipes 46A and 46A by bolts in a state where the flanges are superimposed on each other, both half pipes 46A and 46A are integrated.

To the inside of an end portion of the second lateral bar 43 at a side opposite to the first lateral bar 42, an angular cylindrical slider 51 is fitted linearly movably. At the fitting portion between the second lateral bar 43 and the slider 51, in the same manner as the vertically extensible bar 22, slots 43N and 43N are formed in both side surfaces of the second lateral bar 43 and through holes 51M are formed in the slider 51, and accordingly, the slider 51 can be fixed to an arbitrary position with respect to the second lateral bar 43 by bolts and nuts.

In upper and lower both side surfaces of the second lateral bar 43, slits 43S (refer to FIG. 4) are formed, and portions of the slider 51 are exposed to the upper and lower sides. From the upper and lower exposed portions of the slider 51, as shown in FIG. 3, extending members 52 and 53 extend upward and downward respectively, and are bent at a right angle at halfway portions toward the column 12 side. At a tip end portion of the upper extending member 52, a rotary engagement part 54 is provided, and at a tip end portion of the lower extending member 52, a contact plate 55 is provided.

Figure 4:
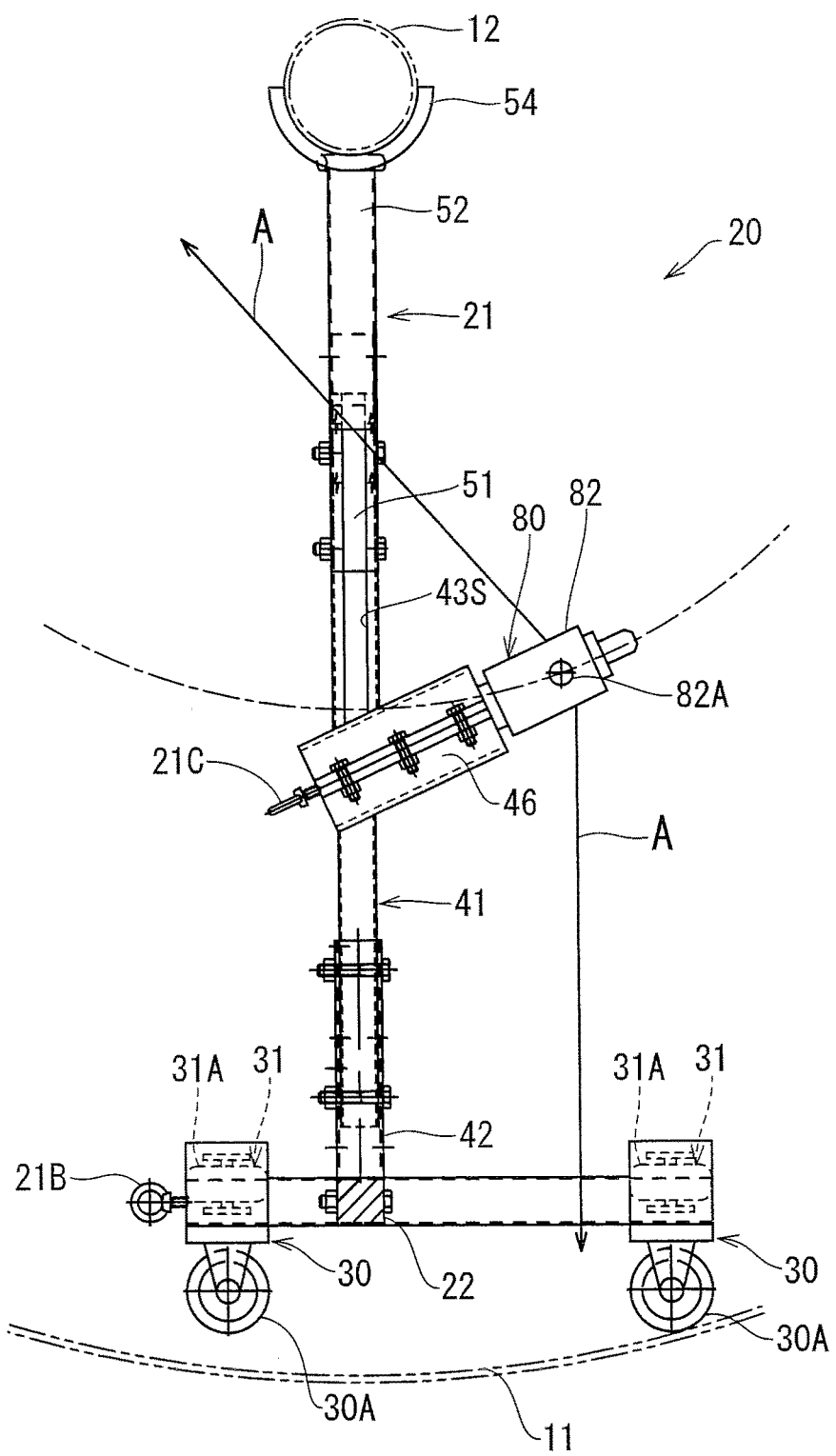
FIG. 4 is a plan view of the helically traveling cleaning machine.

As shown in FIG. 4, the rotary engagement part 54 has a semicircular groove structure capable of coming into face contact with the outer circumferential surface of the column 12. As shown in FIG. 3, the length of the swivel arm 41 is adjusted in such a manner that the rotary engagement part 54 comes into contact with the outer circumferential surface of the column 12 in a state where the upper and lower side casters 30 and 32 of the helically traveling carriage 21 are in contact with the inner circumferential surface of the cylindrical wall 11. The contact plate 55 (refer to FIG. 3) assumes a bent plate shape corresponding to the outer circumferential surface of the column 12. The rotary engagement part 54 is in contact with the outer circumferential surface of the column 12 and the contact plate 55 also comes into face contact with the outer circumferential surface of the column 12.

In the present embodiment, the above-described swivel arm 41, slider 51, extending members 52 and 53, upper and lower side casters 30 and 32, rotary engagement part 54, and contact plate 55 constitute the "lateral bridge mechanism" according to the present invention. The upper and lower side casters 30 and 32 are equivalent to the "first moving-and-contacting part" of the present invention, and the rotary engagement part 54 and the contact plate 55 are equivalent to the "second moving-and-contacting part" of the present invention.

The above is a description of the constitution of the helically traveling carriage 21, and this constitution enables the helically traveling carriage 21 to roll and move down on the helical wall 13 while rotating around the column 12 inside the helical structure 10. As shown in FIG. 2, to rear end portions of the upper base 23, the lower base 24, and the device fixing part 46 in the traveling direction of the helically traveling carriage 21, eye bolts 21A, 21B, and 21C to which wires are coupled are attached.

As shown in FIG. 4, to the device fixing part 46 of the helically traveling carriage 21, the cleaning device 80 is attached, and the cleaning device 80 and the helically traveling carriage 21 constitute the helically traveling cleaning machine 20. As shown in FIG. 2, the cleaning device 80 includes a jet head 82 rotatably at a front end portion of a device main body 81 having, for example, a columnar shape. The device main body 81 is sandwiched between the pair of half pipes 46A and 46A of the device fixing part 46, and the jet head 82 is attached in a state of projecting forward in the traveling direction of the helically traveling carriage 21. The jet head 82 (equivalent to the "jet part" of the present invention) is provided with one or two jetting ports 82A on a side surface. Further, to a rear end face of the device main body 81, a hose 84 is attached via a one-touch joint 83. Accordingly, a cleaning liquid at a high pressure is supplied to the cleaning device 80 through the hose 84, and the jet head 82 rotates and the cleaning liquid is jetted from the jetting port 82A. The jetting port 82A is structured to jet a cleaning liquid slightly rearward (the arrow A direction in FIG. 4) in the traveling direction of the helically traveling carriage 21 with respect to a side orthogonal to the rotation axis of the jet head 82. The cleaning liquid may be just water, a liquid obtained by mixing a detergent in water, or any other cleaning liquids.

The above is a description of the constitution of the helically traveling cleaning machine 20 of the present embodiment. Next, operations and effects of the helically traveling cleaning machine 20 and the helically traveling carriage 21 are described. If the luggage descending chute being the helical structure 10 shown in FIG. 1 is used for a long period of time, dust produced from luggage accumulates inside the helical structure 10, and cleaning using the helically traveling cleaning machine 20 is performed.

As preparation for cleaning, hooks provided at respective tip ends of a wire having three branched tip ends are fitted to the eye bolts 21A to 21C (refer to FIG. 2) of the helically traveling cleaning machine 20, and the hose 84 is connected to the cleaning device 80 by the one-touch joint 83 (refer to FIG. 2). Then, the helically traveling cleaning machine 20 is carried into the helical structure 10 from the luggage carry-in port provided at the upper end portion of the helical structure 10 and disposed at a location where helical walls 13 and 13 oppose in the vertical direction.

Then, as shown in FIG. 3, the length of the swivel arm 41 is adjusted in such a manner that the upper and lower side casters 30 and 32 of the carriage main body 25 come into contact with the inner circumferential surface of the cylindrical wall 11, and the rotary engagement part 54 and the contact plate 55 come into contact with the outer circumferential surface of the column 12. In addition, the length of the vertically extensible bar 22 is adjusted in such a manner that the lower casters 31 of the carriage main body 25 come into contact with the upper surface of the helical wall 13, and the sliding contact sled 33 comes into contact with the lower surface of the helical wall 13 opposing the upper surface of the helical wall 13 from the upper side. By these operations, the cleaning device 80 is positioned at substantially center between the upper and lower helical walls 13 and 13 and at substantially center of a radius of the inner circumferential surface of the cylindrical wall 11, and accordingly, the preparation work is completed.

Next, the cleaning water is supplied to the cleaning device 80 through the hose 84. Then, the jet head 82 of the cleaning device 80 jets the cleaning water all around while rotating. Accordingly, the upper surface and the lower surface of the helical wall 13, the inner circumferential surface of the cylindrical wall 11, and further, the outer circumferential surface of the column 12, are cleaned by the cleaning liquid. To move the helically traveling cleaning machine 20, the wire is gradually fed out. Then the helically traveling cleaning machine 20 is subjected to a force in a direction of moving down on the helical wall 13 due to its own weight, and this force is converted into a moment around the column 12 by the engagement between the rotary engagement part 54 and the column 12.

Accordingly, the helically traveling cleaning machine 20 moves down on the helical wall 13 while swiveling around the column 12, and can smoothly carry the cleaning device 80 and efficiently clean the inside of the helical structure 10. Even if the helically traveling cleaning machine 20 is caught by, for example, a slight step of the helical wall 13 and cannot move down on the helical wall 13 by its own weight, the jet head 82 of the cleaning device 80 jets a cleaning liquid obliquely rearward and provides a propulsive force to the helically traveling cleaning machine 20, so that the helically traveling cleaning machine 20 can move down without being influenced by the step.

The helically traveling cleaning machine 20 is extracted from the luggage carry-out port when arriving at the lower end portion of the cylindrical wall 11. At this time, by removing the hooked wire from the helically traveling cleaning machine 20 and removing the hose 84 from the cleaning device 80, the helically traveling cleaning machine 20 can be easily taken out from the lower section of the cylindrical wall 11, and the wire and hose 84 can be easily pulled out from an upper section of the cylindrical wall 11. Thus, the helically traveling cleaning machine 20 according to the present embodiment can be easily removed after cleaning.

OTHER EMBODIMENTS

The present invention is not limited to the above-described embodiment, and for example, embodiments described below are also included in the technical scope of the present invention, and besides the embodiments described below, the present invention can also be variously changed without departing from the spirit of the present invention.

Figure 5:
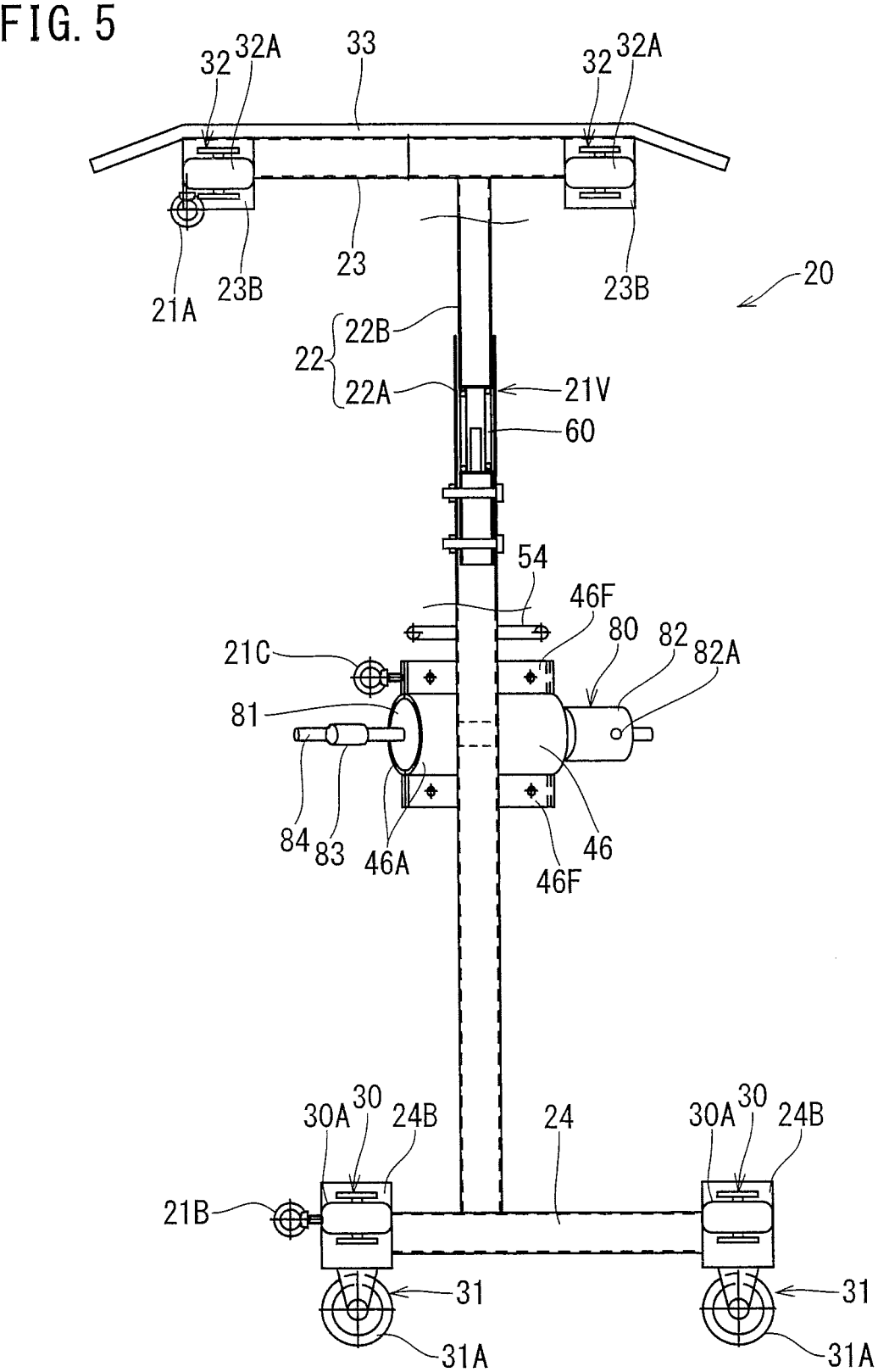
FIG. 5 is a side view of a helically traveling cleaning machine according to a modification.

(1) In the embodiment described above, like the helically traveling carriage 21V shown in FIG. 5, it is also possible that a compression coil spring 60 (equivalent to the "vertical stretching elastic member" according to the present invention) is received inside the lower bar 22A of the vertically extensible bar 22 and the compression coil spring 60 is compressed and deformed by being pushed by the upper bar 22B, and by a resilient force of the compression coil spring 60, the lower casters 31 and the sliding contact sled 33 are pressed against the upper and lower helical walls 13 and 13. The vertical stretching elastic member is not limited to the compression coil spring 60, and may be, for example, a hydraulic damper.

Figure 6:
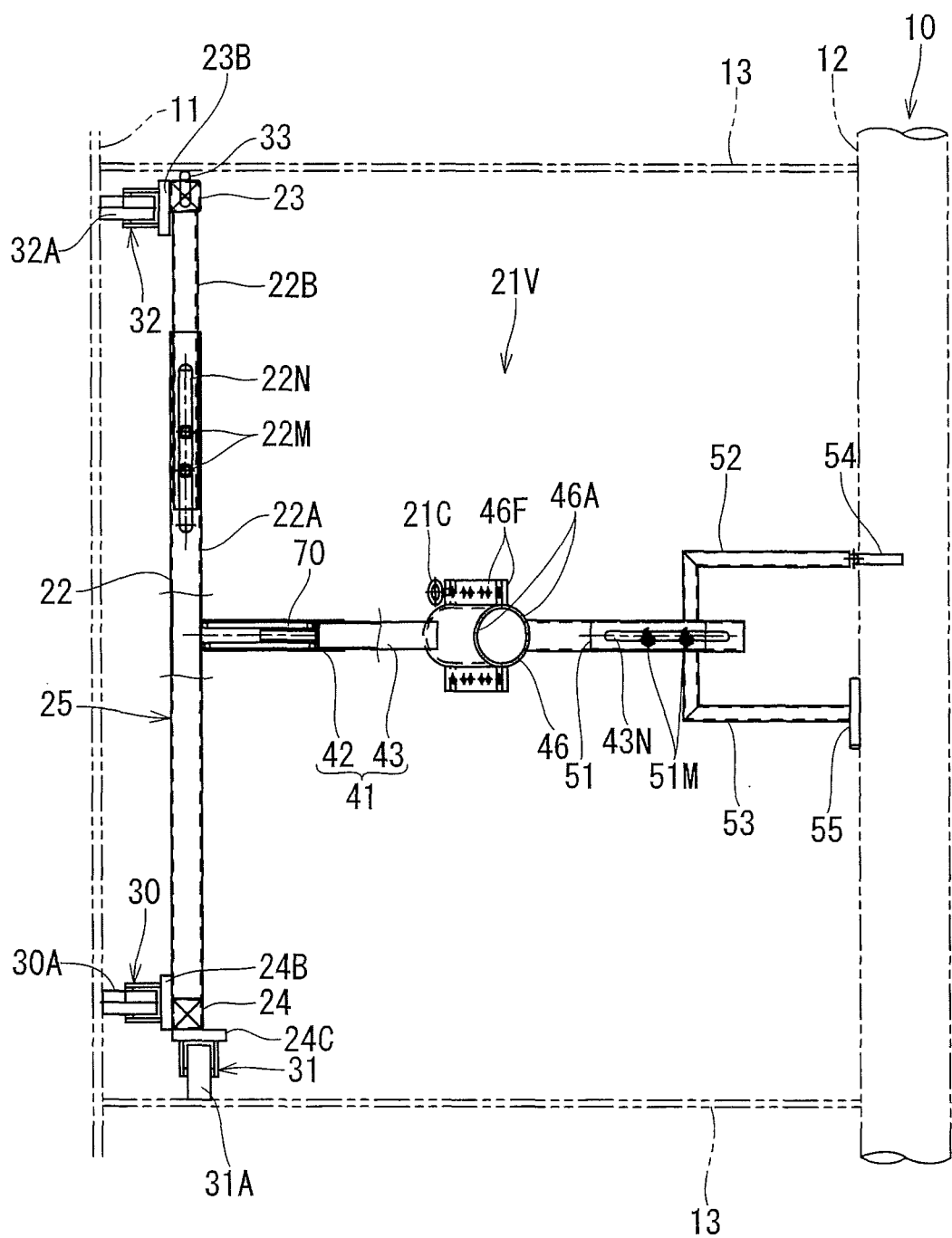
FIG. 6 is a front view of a helically traveling cleaning machine according to a modification.

Likewise, like the helically traveling carriage 21V shown in FIG. 6, it is also possible that, in the swivel arm 41, a compression coil spring 70 (equivalent to the "lateral stretching elastic member" according to the present invention) is received inside the first lateral bar 42 and the compression coil spring 70 is compressed and deformed by being pushed by the second lateral bar 43. The upper and lower side casters 30 and 32 are pressed against the inner circumferential surface of the cylindrical wall 11, and the rotary engagement part 54 and the contact plate 55 are pressed against the column 12 by a resilient force of the compression coil spring 70. With this constitution, positioning of the cleaning device 80 in an axial direction and a radial direction of the cylindrical wall 11 is stabilized. The lateral stretching elastic member is not limited to the compression coil spring 70, and may be, for example, a hydraulic damper.

Figure 7:
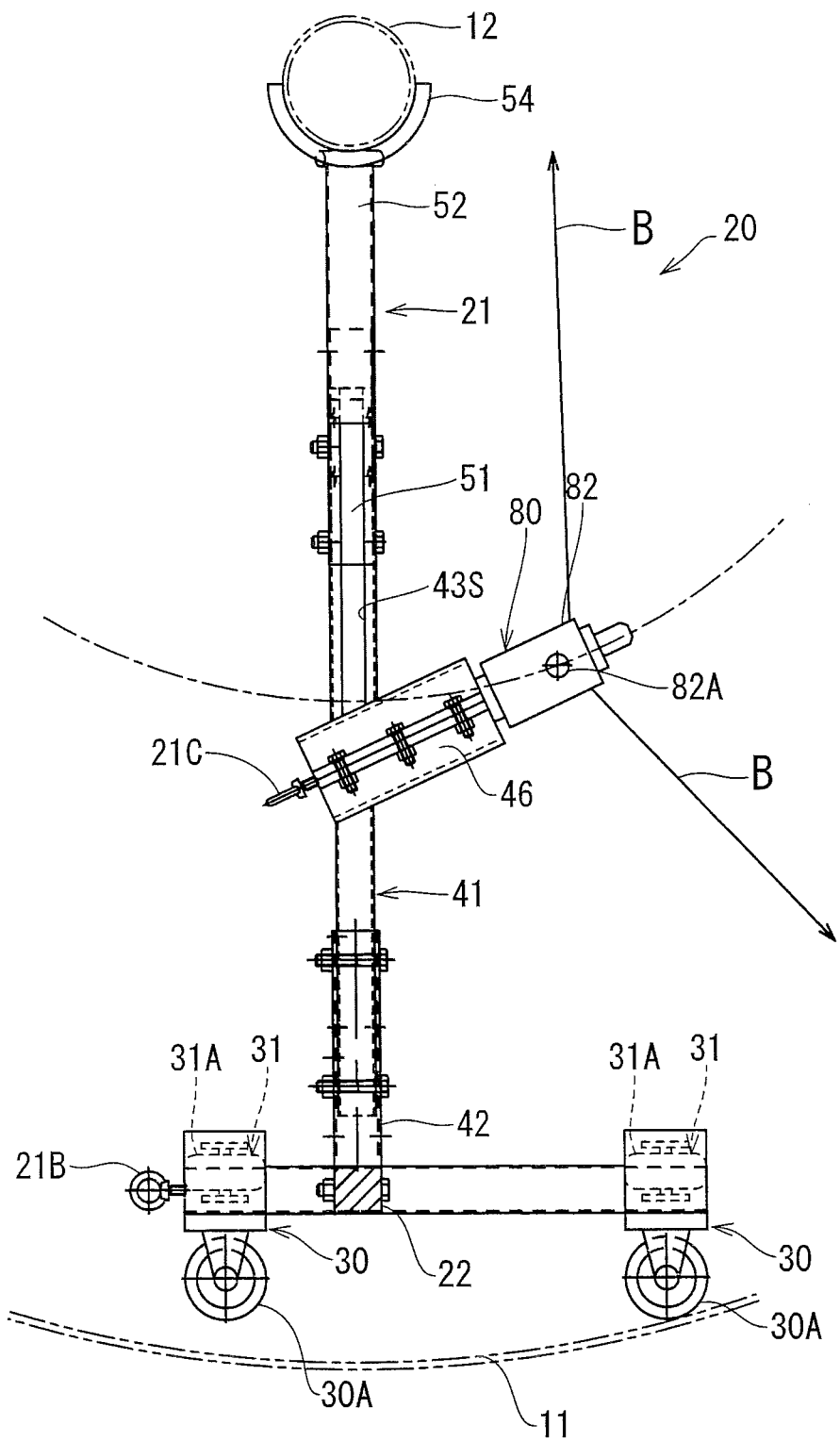
FIG. 7 is a plan view of a helically traveling cleaning machine according to a modification.

(2) The cleaning device 80 of the embodiment described above jets a cleaning liquid obliquely rearward with respect to a traveling direction of the helically traveling carriage 21, however, as shown in FIG. 7, it is also possible that the cleaning device 80 is constituted so as to jet a cleaning liquid obliquely forward (the arrow B directions in FIG. 7) with respect to the traveling direction of the helically traveling carriage 21. With this constitution, cleaning can be performed while waste water after cleaning is moved forward by a jetting pressure.

(3) In the embodiment described above, the helically traveling cleaning machine 20 to clean the helical structure 10 being a luggage descending chute is illustrated, however, the helically traveling cleaning machine and the helically traveling carriage according to the present invention can also be used for cleaning or the like of, for example, a carrying device that carries powder and granular materials by rotating the helical wall 13 together with the column 12 inside the cylindrical wall 11, and an excavator that carries soil. In addition, the helically traveling cleaning machine and the helically traveling carriage according to the present invention can also be used for cleaning or the like of a helical structure being a centrifugal separator that has substantially the same structure as the luggage descending chute described above, and lets air containing dust pass through the inside and separates dust and air by a centrifugal force.

(4) In the embodiment described above, an example in which the cleaning device 80 is equipped on the helically traveling carriage 21 as the "maintenance device" according to the present invention is shown, however, for example, a camera for inspection of the inside of the helical structure 10, a disinfectant solution sprayer that disinfects the inside of the helical structure 10 or the like, or a painting device to paint the inside of the helical structure 10 may be equipped as the "maintenance device" on the helically traveling carriage 21.

(5) A constitution is also allowed in which the upper base 23 is fixed to the upper end portion of the lower bar 22A of the helically traveling carriage 21 of the embodiment described above and the upper bar 22B and the sliding contact sled 33 are eliminated in such a manner that the helically traveling carriage 21 is not stretched between the upper and lower helical walls 13 and 13.

DESCRIPTION OF THE REFERENCE NUMERAL

10 Helical structure
11 Cylindrical wall
12 Column
13 Helical wall
20 Helically traveling cleaning machine
21, 21V Helically traveling carriage
22 Vertically extensible bar
30 Lower side caster (first moving-and-contacting part)
31 Lower caster (lower moving-and-contacting part)
32 Upper side caster (first moving-and-contacting part)
33 Sliding contact sled (third moving-and-contacting part)
54 Rotary engagement part (second moving-and-contacting part)
55 Contact plate (second moving-and-contacting part)
60 Compression coil spring (vertical stretching elastic member)
70 Compression coil spring (lateral stretching elastic member)
80 Cleaning device (maintenance device)
82 Jet head (jet part)
83 One-touch joint
84 Hose

The invention claimed is:

1. A helically traveling carriage that travels inside a helical structure formed by winding a helical wall around a column at a central section of a vertically extending cylindrical wall, and carries a maintenance device to maintain the inside of the helical structure, comprising:

a lateral bridge mechanism adapted to bridge an outer circumferential surface of the column and an inner circumferential surface of the cylindrical wall, the lateral bridge mechanism having, on one end portion thereof, a first moving-and-contacting part having a first wheel being rotatable about a vertically extending rotation axis thereof and being adapted to roll on the inner circumferential surface of the cylindrical wall, and having, on an other end portion, a rotary engagement part having a surface adapted to rotatably engage with the column; and a lower moving-and-contacting part connected to the lateral bridge mechanism so as to be arranged below the first moving-and-contacting part and having a second wheel being rotatable about an axis orthogonal to the vertically extending rotation axis of the first wheel and being adapted to roll on an upper surface of the helical wall, wherein the second wheel is laterally offset from a center of the lateral bridge mechanism in a direction toward the inner circumferential surface of the cylindrical wall, wherein the first wheel of the first moving-and-contacting part includes a plurality of first wheels being aligned along a circumferential direction of the cylindrical wall and each of the plurality of first wheels is rotatable about the vertically extending rotation axis, and wherein the second wheel of the lower-moving-and-contacting part includes a plurality of second wheels aligned along the circumferential direction of the cylindrical wall, and wherein the helically traveling cleaning machine further comprises:

a lower base provided in the first moving-and-contacting part and extending in the circumferential direction of the cylindrical wall, the lower base including a wheel of the plurality of first wheels on a side surface of end portions of the lower base in a longitudinal direction of the lower base and including a wheel of the plurality of second wheels on a lower surface of the end portions in the longitudinal direction thereof; and an upper base provided in the first moving-and-contacting part, arranged above the lower base and extending in a circumferential direction of the cylindrical wall, the upper base including another wheel of the plurality of first wheels on a side surface of end portions of the upper base in a longitudinal direction of the upper base.

2. The helically traveling carriage according to claim 1, comprising: a lateral stretching elastic member adapted to bring the lateral bridge mechanism into a stretched state between the outer circumferential surface of the column and the inner circumferential surface of the cylindrical wall.

3. A helically traveling cleaning machine comprising:
the helically traveling carriage set forth in claim 2; and
a cleaning device as the maintenance device that has a central axis along a traveling direction of the helically traveling carriage, and includes a jet part having a component that jets a cleaning liquid in all directions from the central axis.

4. The helically traveling cleaning machine according to claim 3, wherein the jet part of the cleaning device jets the cleaning liquid while rotating around the central axis.

5. The helically traveling carriage according to claim 1, wherein the rotary engagement part comprises a groove-shaped structure adapted to receive a portion of the column and slide on the column.

6. A helically traveling cleaning machine comprising:
the helically traveling carriage set forth in claim 5; and
a cleaning device as the maintenance device that has a central axis along a traveling direction of the helically traveling carriage, and includes a jet part having a component that jets a cleaning liquid in all directions from the central axis.

7. A helically traveling cleaning machine comprising:
the helically traveling carriage set forth in claim 1; and
a cleaning device as the maintenance device that has a central axis along a traveling direction of the helically traveling carriage, and includes a jet part having a component that jets a cleaning liquid in all directions from the central axis.

8. The helically traveling cleaning machine according to claim 7, wherein the jet part of the cleaning device jets the cleaning liquid while rotating around the central axis.

9. The helically traveling cleaning machine according to claim 8, wherein the jet part jets the cleaning liquid obliquely rearward with respect to the traveling direction of the helically traveling carriage.

10. The helically traveling cleaning machine according to claim 8, wherein the jet part jets the cleaning liquid obliquely forward with respect to the traveling direction of the helically traveling carriage.

11. The helically traveling cleaning machine according to claim 7, wherein the jet part jets the cleaning liquid obliquely rearward with respect to the traveling direction of the helically traveling carriage.

12. The helically traveling cleaning machine according to claim 7, wherein the jet part jets the cleaning liquid obliquely forward with respect to the traveling direction of the helically traveling carriage.

13. The helically traveling cleaning machine according to claim 7, wherein the cleaning device includes a one-touch joint to which a hose extending from a supply source of the cleaning liquid is removably connected.

* * * * *